United States Patent [19]

Lardrot et al.

[11] Patent Number: 5,171,188

[45] Date of Patent: Dec. 15, 1992

[54] BELT TENSIONER FOR INTERNAL COMBUSTION ENGINE

[75] Inventors: Eric Lardrot, Imphy; David Mayau; Philippe Stamm, both of Decize, all of France

[73] Assignee: Caoutchouc Manufacture et Plastiques, Versailles, France

[21] Appl. No.: 771,774

[22] Filed: Oct. 4, 1991

[30] Foreign Application Priority Data

Oct. 4, 1990 [FR] France .................................. 90 12342

[51] Int. Cl.⁵ .............................................. F16H 7/08
[52] U.S. Cl. .................................. 474/133; 123/90.31
[58] Field of Search ........ 474/101, 109, 111, 113–117, 474/133–136; 123/90.31

[56] References Cited

U.S. PATENT DOCUMENTS

| | | | |
|---|---|---|---|
| 3,975,965 | 8/1976 | Speer | 74/242.11 |
| 4,144,772 | 3/1979 | Brackin et al. | 74/242.15 |
| 4,925,437 | 5/1990 | Suzuki et al. | 474/135 |
| 4,966,571 | 10/1990 | Guillebon | 474/133 X |
| 5,033,423 | 7/1991 | Diard | 474/133 X |
| 5,112,281 | 5/1992 | Minato et al. | 474/133 X |

FOREIGN PATENT DOCUMENTS

| | | |
|---|---|---|
| 0114779 | 8/1984 | European Pat. Off. . |
| 0157193 | 9/1985 | European Pat. Off. . |
| 0294919 | 12/1988 | European Pat. Off. . |
| 0373056 | 6/1990 | European Pat. Off. . |
| 3637103 | 5/1988 | Fed. Rep. of Germany . |
| 3724963 | 2/1989 | Fed. Rep. of Germany . |
| 2591700 | 6/1987 | France . |
| 2611018 | 4/1988 | France . |
| 2617556 | 1/1989 | France . |
| 2640016 | 6/1990 | France . |
| 318686 | 2/1957 | Switzerland . |
| 2070727 | 9/1981 | United Kingdom . |

*Primary Examiner*—Thuy M. Bui
*Attorney, Agent, or Firm*—Nils H. Ljungman and Associates

[57] ABSTRACT

An internal combustion engine having a power generating device, and a transmission link connecting the power generating device to an accessory operated by the power generating device, the transmission link being tensioned by a tension adjusting device which pivots, during tension relaxation, around an imaginary center of rotation, and during a tension increase, around a stop, such that the two elastic rigidities achieved for both rotations are in a ratio of at least two.

20 Claims, 4 Drawing Sheets

BELT TENSIONER FOR INTERNAL COMBUSTION ENGINE

BACKGROUND OF THE INVENTION

1. Field of the Invention

This invention related to internal combustion engines which employ flexible link transmissions, such as belts. The belts rely on mechanical adherence, or friction, to drive a pulley. Such a belt operates driven devices which receive mechanical power, via the belt which is driven by an internal combustion engine. The belts are used, more specifically, to drive accessories on automobile engines. The belts must be placed under a specific amount of tension for proper operation, and this tension may be applied by a roller positioned at the end of a movable lever arm. The lever arm is generally a part of a tensioning device which receives an elastic torque that can be provided by biasing means.

The biasing means may be an elastomeric sandwich which is integrally bonded to rigid armatures, and thereby utilizes the elastic force from the shearing of the elastomeric sandwich to ensure that the engagement of the transmission belt with the pulleys is maintained.

2. Background Information

Flexible link transmissions which operate by mechanical adherence of a flexible link to pulleys, require an elastic tensioning means to make possible the mechanical adherence of the flexible link to the pulleys. This is essentially true whether the driving surface of the flexible link is flat, trapezoidal or grooved. Such a flexible link is commonly called a "belt", and these belts are generally made of cabled materials having high rigidity, such as polyester, glass fiber or aramid.

Such flexible links, or belts are used on automobiles, or stationary engines to drive accessories such as, water pumps, alternators, air conditioners, power steering pumps, etc. These accessories are positively driven by the flexible link which connects the accessories to a driven shaft of the engine The adherence of the belt to the pulleys of the driven accessories and to the driven shaft is generally maintained by a tensioning device which utilizes an idler pulley.

The term "idler pulley" is commonly used when the high intrinsic rigidity of the longitudinal armature of the belts, requires a permanent tension established by an elastic thrust on a guide pulley. Such a guide pulley is most conveniently arranged in contact with the smooth surface constituting the back of the belt. By using such an arrangement, any variations caused by thermal expansion of the various constituents of the system, and primarily all the momentary elastic variations or permanent modifications of the length of the perimeter of the belt due to wear or to creep, even if these variations are low, are compensated for by displacement of the elastic tensioning means of the idler pulley.

There are numerous types of idler pulleys which operate by the pivoting of an arm around an axis, which arm is elastically tensioned by a metal spring, with or without damping means. Tensioning devices which integrate both of the two functions of tensioning and damping into an elastomeric ring are disclosed in U.S. Pat. No. 4,144,772 (The Toro Company), in GB 2,070,724 (Alan Cresley Pritchard) and EP 0,157,193 (RIV-SKF). The above patents all have in common an elastic recall which is provided by torsion of an elastomeric ring. The devices of these patents, because of the provision of their pivoting on an elastomer material, also have in common the disadvantage that such pivoting also makes possible spherical conical tipping, or wobbling, the angular variations of which interfere with the centering of the belt on the pulley of the tensioning device.

This tipping situation can be improved by using a ring having a longer longitudinal length, which ring is integral with concentric and prestressed armatures. Such a device is disclosed in U.S. Pat. No. 3,975,965 (Dayco Corporation) and EP 0,114,779 (Caoutchouc Manufacture et Plastiques), which devices differ in terms of the tension regulation means, the latter being provided by the rotation of the internal ring. In these two devices the damping, which remains relatively low, is provided exclusively by the visco-elastic character of an elastomer. In addition, Caoutchouc Manufacture et Plastiques, the assignee of the present application, proposed in its French patent application No. 2,640,016, which corresponds to U.S. Pat. No. 5,033,423, a much more radical remedy to the risks of conical tipping in relation to the axis of rotation. This remedy provides the return torque by the deformation of a planar, prestressed elastomeric sandwich, and also provides the damping of dynamic variations by friction of a washer subjected to the stated prestress. Thus, the tipping torques are applied via solids in sliding contact, under much better conditions than via a layer of elastomer, no matter what the level of prestress applied to the device.

This operation is essentially the same as the operation of the device disclosed in patent CH 0,318,686 (Baechen), in which rubber sheets are prestressed between two plates. In both of the devices described above, the dynamic displacements are recalled solely by the rigidity of an elastomeric element, and the damping is provided with a constant force by the rubbing of surfaces fitted with appropriate friction linings.

An asymmetrical damping, in the form of friction, is the subject of documents FR 2,591,700 and FR 2,611,018 (SKF), EP 0,294,919 (Litens Automotive) and DE 3,637,103 (INA Walzlager). A hydraulic damping which is also asymmetrical is provided by the device disclosed in FR 2,617,556 (Hutchinson).

In all of these devices, the tension is provided by metal springs, but each of these arrangements show the requirement for asymmetry in the dynamic variation of tension, which should preferably be more rigid during the increase of the tension, and which should also preferably be more flexible during the relaxation of the tension The predetermined values for this type of damping, whether frictional or hydraulic, although asymmetrical, do not solve all the problems resulting from ranges of spring deflections of variable amplitudes.

An analysis of the prior art shows that none of the devices of the prior art, whatever the type of damping used, achieve an elastic recall having a double rigidity which is asymmetrical on the two sides of the most common service position. However, such a double rigidity is desirable, even essential, in applications involving engines having a lightweight flywheel where the engine pulses can exceed the average value of the drive force of the accessories, i.e., in Diesel engines. Because of these pulses, the normally relaxed strand of the flexible link on which the idler pulley is located, suddenly can become taut and the tensioning device must be able to exert a significantly higher rigidity to prevent a sudden relaxation of the other strands of the flexible link.

OBJECT OF THE INVENTION

The object of the present invention is to propose an internal combustion engine which has a tensioning device which has a simple design, and in which tensioning device there is a combination of the elastic recall function having a differentiated recall rigidity between the tension increase and relaxation, and a differentiated damping function. The differentiated recall rigidity is provided by shearing deformation of a flat, axially-prestressed elastomeric sandwich, and the differentiated damping function is provided by friction of a washer subjected to a prestress. During a first phase of deformation, the rotation of the device occurs around an imaginary axis, while during a second phase of deformation, the intervention of a stop is used to modify the distribution of the stresses.

SUMMARY OF THE INVENTION

The invention relates to a tensioning device for a flexible link transmission, which transmission functions by mechanical adherence of the flexible link to pulleys The idler pulley of the tensioning device is preferably supported by a tensioning lever on which an elastic torque is exerted by torsional shearing of a preferably flat, circular ring of preferably an elastomeric material. The elastomeric ring is preferably integrated with rigid armatures, and is preferably subjected to an axial prestress which makes it possible to dampen the tension variations by the relative friction of flat planar surfaces which are also subjected to the axial prestress. Contact between the planar surfaces also essentially provides resistance to tipping, or wobble, of the tensioning device outside of the plane of the tensioning lever.

The invention is characterized by the fact that the rotation of the tensioning lever, combined with a shearing of the elastomeric ring in the same plane, preferably takes place around an imaginary center of rotation, and that the entry of the tensioning lever into contact with a stop in the immediate vicinity of the operating position, essentially makes it possible, by changing the center of rotation of the arm forming the tensioning lever, for the tensioning device to have two significantly different rigidities for the elastic recall of the idler pulley. The lower rigidity preferably is used during the relaxation of the tension, and the other, higher rigidity, preferably is used for an increase of the tension of the flexible link.

One aspect of the invention resides broadly in an internal combustion engine having a mechanical power generating device for generating mechanical power, a first wheel connected to and receiving mechanical power from the mechanical power generating device, a second wheel positioned in spaced apart relation to the first wheel, the second wheel being connected to and receiving at least a portion of the mechanical power from the first wheel, a belt having a surface, the belt being connected between the first wheel and the second wheel for transferring mechanical power from the first wheel to the second wheel, and a belt tensioning device for being in contact with the surface of the belt for adjusting the tension of the belt by applying a controlled amount of force to the surface of the belt. The belt tensioning device comprises a mounting device for being mounted on a first surface, the mounting device for movably supporting the belt tensioning device, a movable member having a first end and a second end, the movable member being at least rotatably movable relative to the mounting device to alter the tension of the belt. The first end of the movable member is for being in contact with the belt, and the second end of the movable member is for being resiliently connected to the mounting device by a resilient member. The resilient member is for receiving a torsional force and applying a torsional counter force between the mounting device and the movable member when the movable member is rotated relative to the mounting device. The movable member of the tensioning device is substantially rotatable about at least a first center of rotation and a second center of rotation, the first center of rotation being substantially adjacent the second end of the movable member. In addition, the mounting device comprises a stop for limiting rotation of the movable member around the first center of rotation, which stop comprises the second center of rotation. This second center of rotation is positioned substantially between the first center of rotation and the first end of the movable member, such that the torsional counter force has a first elastic recall rigidity during rotation about the first center of rotation, and the torsional counter force has a second elastic recall rigidity during rotation about the second center of rotation.

Another aspect of the invention resides broadly in a belt tensioning device for tensioning a belt of a power transmission device, the belt tensioning device for being in contact with a surface of a belt for adjusting the tension of the belt by applying a force to a first surface of the belt, the belt tensioning device having a mounting device for being mounted on a first surface, the mounting device for movably supporting the belt tensioning device, and a movable member having a first end and a second end, the movable member being at least rotatably movable relative to the mounting device to alter the tension of the belt. The first end of the movable member is for being in contact with the belt, while the second end of the movable member is for being resiliently connected to the mounting device by a resilient member, the resilient member being for receiving a torsional force and applying a torsional counter force between the mounting device and the movable member when the movable member is rotated relative to the mounting device. The movable member is substantially rotatable about at least a first center of rotation and a second center of rotation, the first center of rotation being substantially adjacent the second end of the movable member. In addition, the mounting device comprises a stop for limiting rotation of the movable member around the first center of rotation, the stop comprising the second center of rotation, the second center of rotation being positioned substantially between the first center of rotation and the first end of the movable member, such that the torsional counter force has a first elastic recall rigidity during rotation about the first center of rotation, and the torsional counter force has a second elastic recall rigidity during rotation about the second center of rotation.

BRIEF DESCRIPTION OF THE DRAWINGS

The invention is explained in greater detail below, with reference to the accompanying drawings, in which.

DESCRIPTION OF THE PREFERRED EMBODIMENTS

Figure 1:
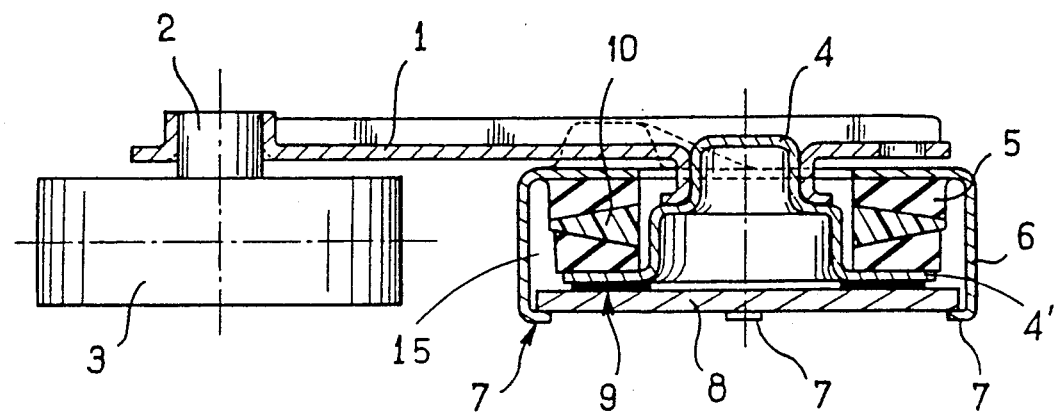
FIG. 1 is a cross section of the tensioning device according to the invention, through a plane of symmetry of the tensioning lever and the elastomeric ring.
Figure 1A:
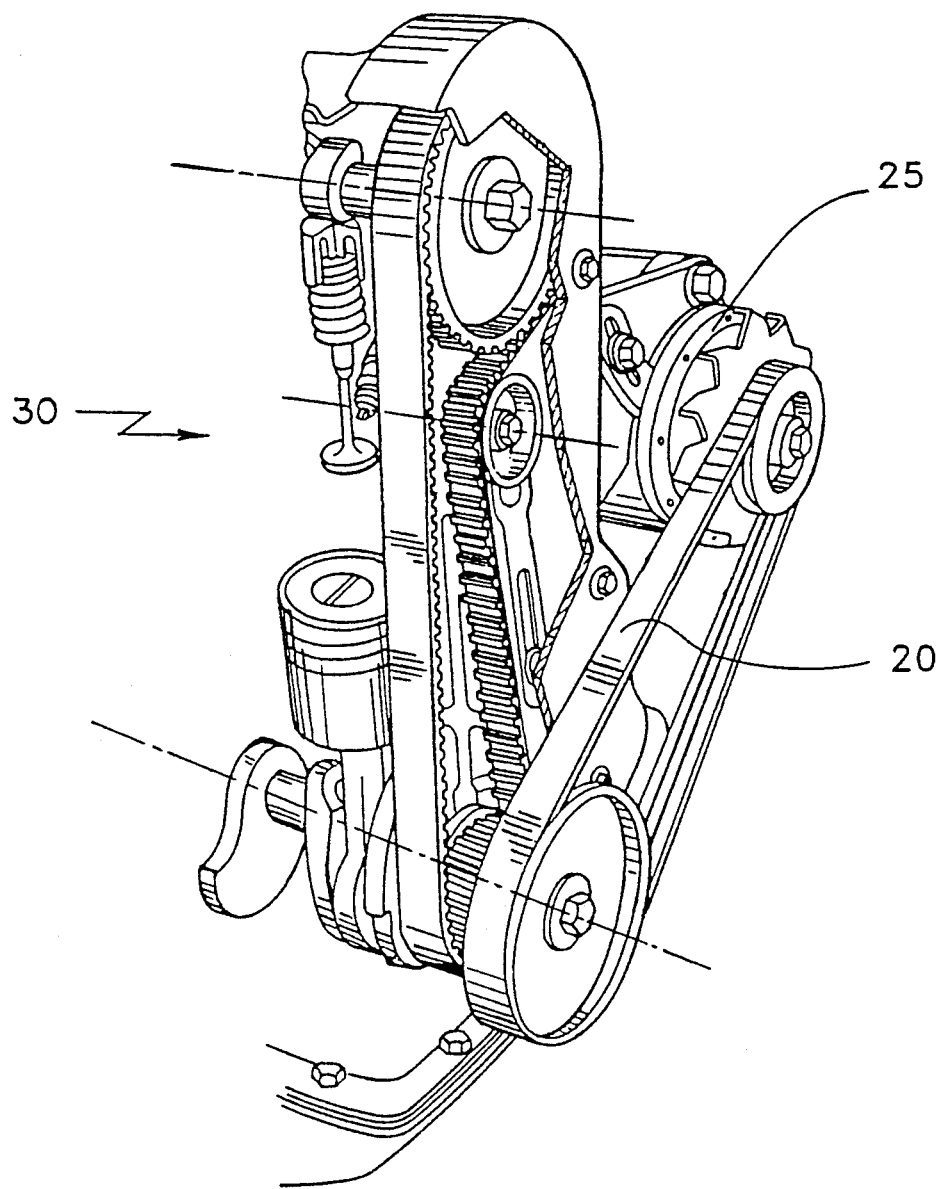
FIG. 1a is a perspective view, partially in section, of a portion of a known internal combustion engine.

FIG. 1a shows a known combustion engine, which can be used, for example, in an automobile. Internal combustion engine 30 is designed to operate a plurality of accessories, such as an alternator 25, a water pump (not shown), etc., in addition to typically propelling an automobile or the like or providing power for stationary purposes. Under typical operating conditions, the belt 20 transfers the mechanical power from the engine to the accessories. This is generally only possible when the belt 20 is tensioned properly on the engine.

FIG. 1 is a cross section of a tensioning device, taken through the tensioning lever 1 and the flat elastomeric ring 5, the assembly of which essentially constitutes the present invention. The cross section constitutes the plane of symmetry of the elastic tensioning system when the device is at rest.

The tensioning lever 1, which can preferably be made from a stamped steel sheet, can support a cylindrical pulley 3 by means of a fitting provided in the lever 1 for accepting the axle 2 of the pulley 3. The pulley 3 can have a shape known in the prior art, and can preferably be mounted by means of ball bearings or needle bearings, on the axle 2. The pulley 3 will generally be in contact with the belt 20 to provide tension to the belt.

The tensioning lever 1 is also preferably rigidly connected to the connecting axle 4 by means of force fitting the axle 4 into the tensioning lever 1. The connecting axle 4 is essentially of a round form made preferably of stamped or rotary-extruded steel sheet.

The flat extremity 4' of the connecting axle 4 acts as an external armature for a ring 5, made of an elastomer compound, to which the armature 4' is intimately bonded. The other external armature for the ring 5 essentially consists of the bottom of the casing 6 to which the ring 5 is also intimately bonded.

A gap 15, which results from the formation of the device, is used to preferably allow for the radial deflection, which turns out to be necessary for the functioning of the device.

The casing 6 can be equipped with clamping pads 7 which make it possible to close the casing 6 over a flat plate which forms the fastening plate 8, preferably after assembly of the tensioning device.

This closing of the casing 6 over the plate 8 is performed under an axial compression prestress to which the elastomeric ring 5, as well as a friction washer 9 are subjected. The friction washer 9 may be interposed in the assembly preferably between the armature 4' of connecting axle 4 and the fastening plate 8. Thus, when the two armatures connected to the ring 5, namely the extremity 4' of the connecting axle 4 on the one side, which is rigidly connected to the tensioning lever 1, and on the other side, the casing 6 enclosed over the fastening plate 8, are deflected in relation to one another, the friction washer 9 on which the prestress is exerted, preferably accompanies the relative displacements to dampen, by friction, the dynamic variations of the tension force. So that the friction washer 9 can perform this task, it should preferably be made of a material having a low, but relatively invariable coefficient of friction. Such a material may be, for example, vinyl polytetrafluoride or polyethylene having a very high molecular weight, whose coefficient of friction is preferably on the order of about 0.10 or 0.11 and with a separation value which preferably does not exceed about 0.16.

Since the principal movement of the deformation allowing the elastic recall is a rotation around the axis of revolution of the elastomeric ring 5, the variations of this rotation are essentially dampened by the friction of the washer 9, under the permanent action of the axial prestress.

The friction washer 9 can be replaced by an appropriate treatment of any of the friction surfaces which face one another.

The compression rigidity of the ring 5, which essentially exerts this prestress, can be advantageously improved by the interposition, during fabrication, of at least one internal armature 10 to ensure binding. In this manner, the ring 5 can preferably be layered to form a flat sandwich having an elastomeric compound layer, an internal armature, and a second elastomeric layer. The internal armature 10, which is preferably of a round form, can preferably be made of a rigid polymer or metal which can be intimately bonded to the elastomer compound of the flat sandwich 5. The binding provided by the internal armature, along with the customary moduli of the elastomer compounds used, essentially makes it possible to apply a prestress on the order of from about 10 to about 25 bars, which prestress is repeated, or nearly so, on the friction surface of the washer 9 or the surface of the solid bodies replacing it, whose diameters are preferably close to those of the disc sandwich 5. This stress, multiplied by the coefficient of friction indicated above, essentially makes it possible to exert frictional forces parallel to the surface, on the same order of magnitude as those forces exerted by the shearing of the elastomer compound between its armatures, effectively damping the dynamic variations of the resultant tension.

In a rotation around the axis of the circular sandwich 5, the shear at any point in the material is generally proportional to its distance from the axis of rotation. The internal armature 10 can therefore have a flat shape, or preferably a biconical shape, as shown, so that the thickness of the two elastomeric elements of the circular sandwich 5, which thickness is also proportional to the radius, preferably has a relative shear of the same value at each point within the elastomeric layers.

In a variant not illustrated, additional armatures, which can also be flat or biconical, can be interposed, to essentially achieve the same result.

Figure 2:
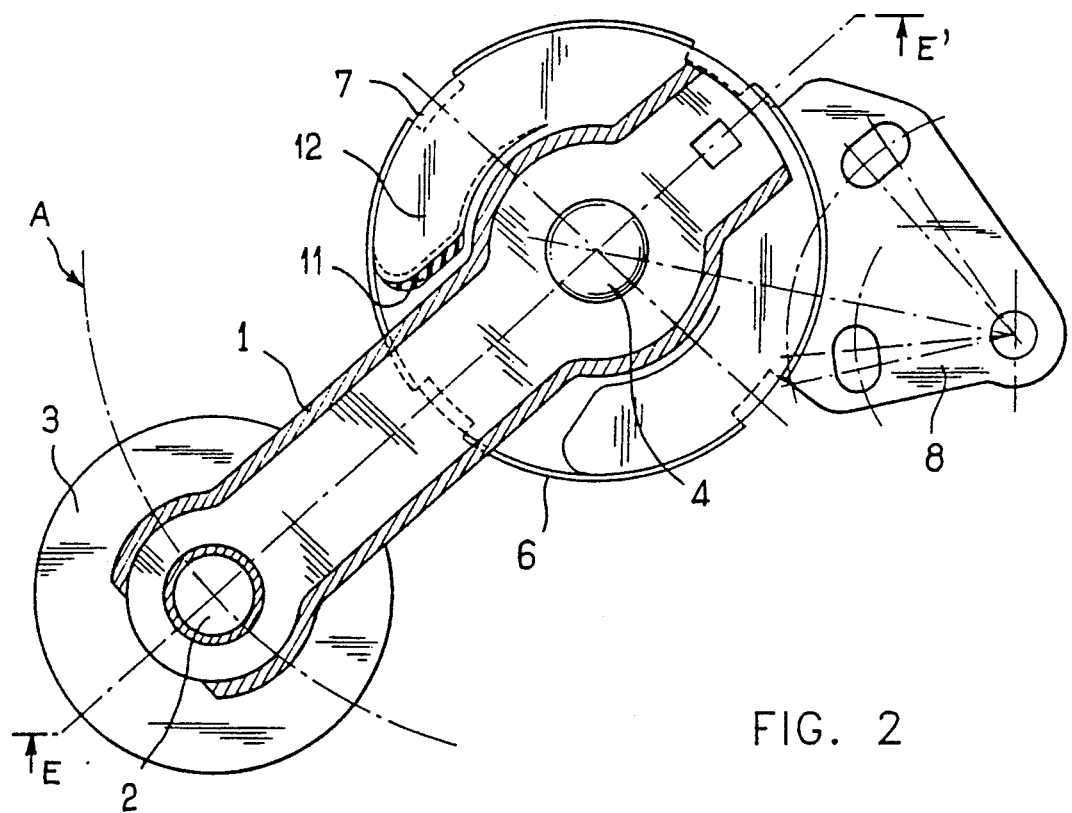
FIG. 2 is a front view of the tensioning device, perpendicular to the pivoting axis and to the axis of the pulley, which pulley axis essentially remains parallel to the pivoting axis.

FIG. 2 is a front view of the tensioning device, perpendicular to both the pivoting axis and to the axle 2 of the cylindrical pulley 3. The visible parts of the tensioning device as shown in FIG. 2, are the tensioning lever 1, which is preferably rigidly locked to the connecting axle 4, and the casing 6, which is almost completely of a round form and disposed around the connecting axle 4.

The casing 6 is preferably covered by the fastening plate 8, of which plate only the part having holes and slots to mount it on the engine crankcase is visible in the figure. The clamping pads 7, of which there can be any number, although only four are shown in the drawing, essentially provide the circular sandwich 5 with a prestress directed perpendicular to the plane of the figure. The axis E—E' indicates the plane of symmetry along which the cross section illustrated in FIG. 1 is taken.

A trajectory arc A is essentially described during the pivoting of the tensioning lever 1 under the action of a force applied to the cylindrical pulley 3, which force would be exerted substantially orthogonally to the tensioning lever 1. The shear reaction which results on the circular sandwich 5 (not visible in the figure) allows a rotation of the tensioning lever proportional to the value of the torque exerted.

A given shear simultaneously produces a translation, as a unit, of the elastomer compound of the circular sandwich, which translation is also proportional to the force exerted. Since, mathematically, the sum of a rotation by a given angle and of a translation results in one rotation, or can be represented by one rotation, all that remains is to evaluate the actual position of the momentary, or instantaneous center of rotation, which is the center of the trajectory arc (A), and which momentary center of rotation differs little from the center of the connecting axle 4.

Once the elastic equilibrium position desired for the functional use of the tensioning device is reached, a stop 11, with which the tensioning lever 1 comes in contact, can preferably be provided on a projection 12 of the casing 6. Without considering the low elasticity of the stop 11, whose effect can easily be estimated by calculation, the point of contact of the tensioning lever 1 against the stop 11 essentially becomes the center of rotation for the tensioning lever 1, which tensioning lever 1 is elastically recalled by the combined shearing forces of the circular sandwich 5. It is therefore essentially a new rotation with a different lever arm which then occurs, and this ensures the recall rigidity of the cylindrical pulley 3 in the dynamic variations beyond the functional equilibrium position.

Figure 3:
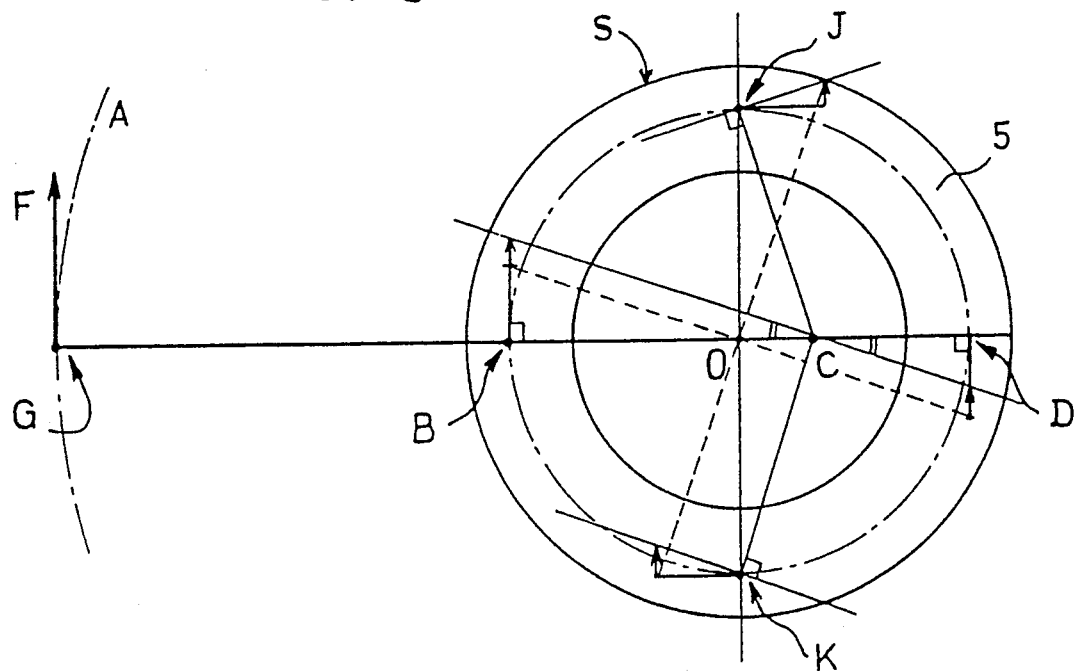
FIG. 3 shows a cross-section of the elastomeric ring 5 with diagramatic illustrations of the forces on the tensioning device and on various points of the flat elastomeric ring, as arranged in FIG. 2.
Figure 3A:
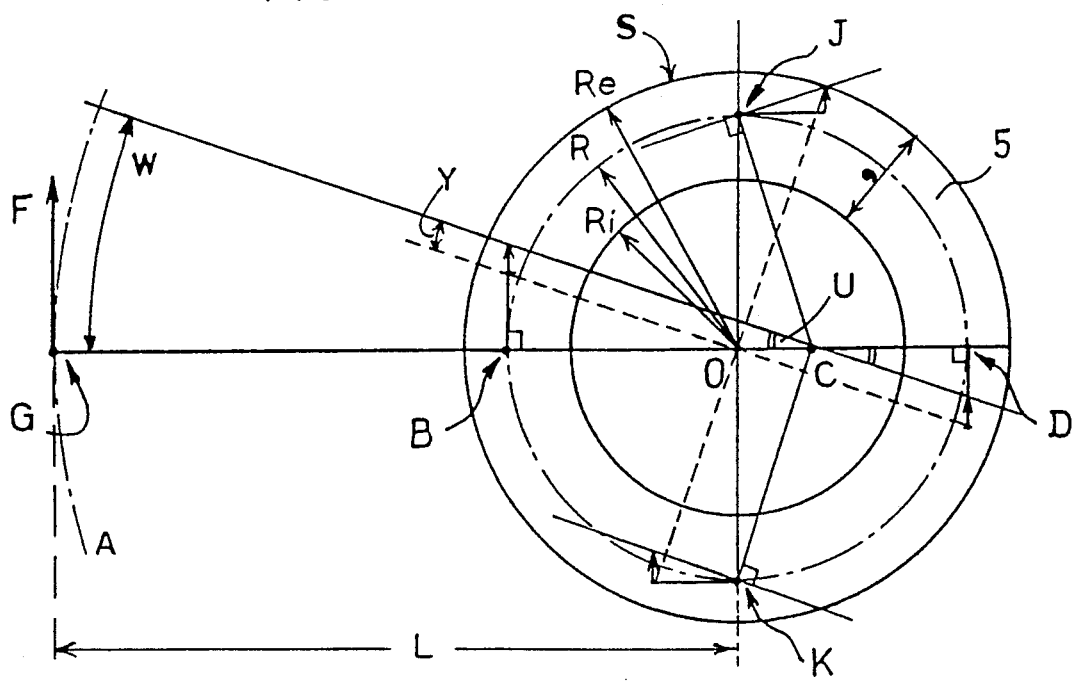
FIG. 3a shows the same cross-section as does FIG. 3, with additional dimensions illustrated.

In order to explain the function of the invention, FIGS. 3 and 3a are diagrams which indicate the geometry of the parts which are visible and/or concealed on FIG. 2. FIGS. 3 and 3a, are cross-sections S of the circular sandwich 5 (see FIG. 5), and the description of FIGS. 3 and 3a include an example of a practical application which makes it possible to define the two rigidities obtained on either side of this equilibrium position.

Figure 5:
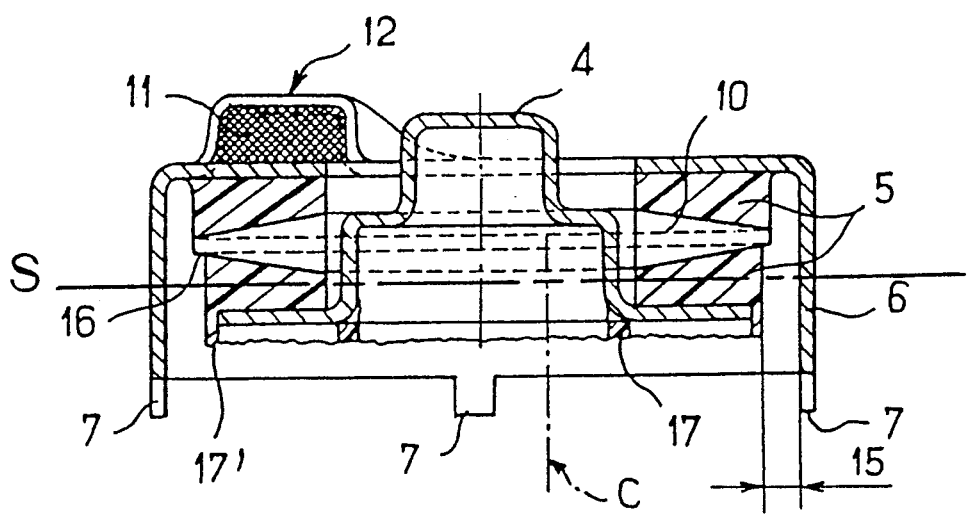
FIG. 5 shows an axial cross section of the rubber/metal component forming the elastomeric ring, an essential element of the device according to the invention.

The application relates to a theoretical lever arm having a length L between the axle of the pulley G where the normal tension force F is exerted, and the center O of the circular sandwich 5. The circular sandwich 5 has an outside diameter of $2 \times Re$, an inside diameter of $2 \times Ri$ and a width (a). A cross sectional area S, taken through the plane of the circular sandwich 5, as shown in FIG. 5, can then be calculated by using the equation $S = \pi \times Re^2 - \pi \times Re^2$. This cross sectional area S is not exactly constant throughout the thickness of the elastomer compound, considering the backing off of the part.

It is preferably desirable, for the optimum operation of the device, that under the action of the torsional torque around the center O of the circular sandwich, the resulting rotation exerts a uniform shear on the elastomer compound having cross sectional area S. With regard to a radius of rotation R, the geometric and not the arithmetic average of the extreme radii Re and Ri, the normal tension force F exerted on the axle of the pulley G is therefore balanced by a total reaction force $T = F \times L/R$, distributed all along the average radius R. However, at each point of the circular sandwich, the stress due to the torsional torque is combined with the stress resulting from the monodirectional reaction F, which is itself distributed within the elastomer compound and is necessary to constitute this torque.

The deformations of the circular sandwich, whose torsional and shear rigidities are considered to be linear, are proportional to one another. Under a shear stress of a shear of $Qr = T/S$ due to the rotation, and $Qt = F/S$ due to the translation, the most-stressed point B undergoes the greatest displacement.

Thus, for a desired movement W and angle U of the axle of the idler pulley G, acting by means of a lever arm with length L, the torsion shear of the elastomer compound exerted around the center O of the sandwich, is $U \times R$, and the reaction force necessary to form a torque results in a translation Y in the direction opposite to the direction of the reaction force, i.e., in the direction of the normal tension force F.

At the most-stressed point B, the two forces are added. The resulting shear rate $Qr + Qt$ is therefore due to a deformation $(U \times R) + Y$.

At the least-stressed point D, the two forces are in opposite directions and are therefore subtractive. The stress rate is $Qr - Qt$ and the deformation is limited to $(U \times R) - Y$.

Likewise, at the extreme points J and K, the displacements result from a vectorial sum of the perpendicular displacements $U \times R$ and Y. It can be easily deduced that the resultant deformation at any other point takes place by rotation around a center C, which is fixed for any value of the deformation at the level of the axle of the idler pulley G.

The distance of the center of rotation C from the center O of the sandwich 5 can be derived from the following equation:

$$\frac{\overline{BC}}{\overline{CD}} = \frac{Qr + Qt}{Qr - Qt} = \frac{(U \times R) + Y}{(U \times R) - Y}$$

The displacement of the lever GO in relation to the axle of the idler pulley G is therefore essentially a rotation around a lever arm which is greater than the length L for the same force F representing the normal tension force. The displacement of the axis of the idler pulley G is equal to $UL + Y$, which results in a flexibility higher than the value initially desired.

In a practical application for a Diesel engine, for example, the normal tension force F specifies a value of about 40 daN. The force F is applied to a theoretical lever arm GO which can have a length $L = 100$ mm. The outside diameter $2 \times Re$ and the inside diameter $2 \times Ri$ of the circular sandwich, respectively can be 74 mm and 42 mm, and the width (a) will then be 16 mm. Using these dimensions, a cross sectional area S of the elastomer compound, taken through the plane of the circular sandwich, can be calculated to be on the order of about 30 cm$^2$ ($S = \pi \times Re^2 - \pi \times Ri^2 = \pi \times 37$ mm$^2 - \pi \times 21$ mm$^2 = 4300$ mm$^2 - 1385$ mm$^2 = 2915$ mm$^2 = 30$ cm$^2$). It follows that the value of the radius of gyration is $R = 30$ mm.

With regard to the equilibrium of forces, the total reaction force T ($T = F \times L/R$) distributed along the radius of gyration R, therefore assumes the value of 133 daN. Consequently, the shear stress due to rotation Qr ($Qr = T/S$) is 4.43 daN/cm² and the shear stress due to translation Qt ($Qr = F/S$) is 1.33 daN/cm².

At the most-stressed point B, the cumulative stress Qr+Qt is therefore 5.76 daN/cm², at the least-stressed point D, the resultant stress Qr−Qt assumes the value 3.10 daN/cm² and, at the extreme points J and K, the vectorial combination of these deformations leads to the value of 4.70 daN/cm².

Thus, for a desired movement W of 20 mm, the shear due to the torsion of the circular sandwich is $U \times R = 6$ mm and the translation Y is 1.8 mm. At the most-stressed point B, the cumulative deformation is 7.8 mm, at the least-stressed point D, the deformation is limited to 4.2 mm, and, at the extreme points J and K, the vectorial combination of these deformations leads to the value of 6.25 mm.

To provide the device with a good operational fatigue strength, a relative shear of the elastomer compound of about 48% at the most-stressed point B, where the deformation is $(U \times R) + Y = 7.8$ mm, can be obtained on condition that the average thickness of the elastomer composition of the circular sandwich is 16.25 mm. The average thickness is the thickness of the elastomer compound at the level of the radius of gyration R, and the thickness throughout the sandwich 5 is variable on account of the biconical shape of the internal armature, in this variant.

All the points of the elastomer compound are preferably stressed at this same rate of 48%. Thus, a value of about 48% will be the practical limit of utilization as explained below.

In a material whose deformation response is proportional to the force applied, which is the case of the elastomer compound of the circular sandwich, in the stress range, the shear stress at the most-stressed point B, $Qr + Qt = 5.76$ daN/cm², corresponds to 48% of the Yerzley's modulus of the elastomer compound, which must therefore have a value of 12 daN/cm². Such a value can be obtained by an appropriate formulation of the elastomer compound, involving, in particular, the selection of the type and amount of reinforcing filler, which most frequently consists of carbon black.

At the least-stressed point D, when the normal tension force F is applied, the shear stress Qr−Qt can be limited to 3.10 daN/cm² and the relative shear $(U \times R) - Y$ will essentially be 26%. Besides, when the practical limit conditions are reached, at this same point, these values reach the levels indicated for the most-stressed point B.

These levels of stresses, which are essentially constant at point B and are limited to this maximum value for the other points, correspond to the conditions most favorable to a long life of the elastomer compound of the circular sandwich, and therefore of the entire device.

The distance from the center of rotation C to the center O is 9 mm, because the length BC is 39 mm and the length CD is 21 mm. The actual lever arm is therefore 109 mm and the flexibility is increased by 9% compared to the value initially specified. The trajectory arc A therefore has as its center the center of rotation C, whose position is a function of the geometric characteristics of the lever and of the circular sandwich. The stop 11 is positioned so that the tensioning lever 1 enters into contact with stop 11 at a specified tension value, e.g. the value corresponding to the normal tension force F. The function of stop 11 is to limit the stress exerted at the most-stressed point B. The stresses and the deformations are then exceeded only when the pulley is pulled, by the flexible link, beyond its equilibrium point.

The additional reactions to the normal tension force F exerted by the flexible link on the axle of the idler pulley G cause an additional rotation of the tensioning lever 1 around the most-stressed point B, in the immediate vicinity of the stop. Consequently, there is an increase of stresses and deformations in all the other points which are less stressed. In particular, it is justifiable to select, as the practical limit condition, which can be exceeded under exceptional conditions, the case where the stress and the deformation at the least-stressed point D reach the values held constant at the most-stressed point B.

Since the arithmetical sum of two rotations is one rotation, it is easy to demonstrate that at this practical limit condition, the deformations and stresses are the same in all points of the circular sandwich: the rotation resulting from the change from the initial condition to this practical limit condition is then one geometrical rotation around the center of the sandwich O.

Any point of the circular sandwich located on the average radius of 30 mm is stressed at the same rate of shear 48%, i.e. 5.76 daN per cm², and undergoes a deformation of 7.8 mm. It can thus be deduced that the displacement of the axle of the idler pulley G is 26 mm beyond the initial condition.

When the center of torsion is moved to the center of the sandwich, the reaction on the axle of the idler pulley G is the sum of the normal tension force F exerted under a first rigidity of the device corresponding to 21.8 mm of deformation for 40 daN (resultant of the actual lever arm 109 mm) and a variable reaction exerted on the stop at the most-stressed point B. For the value considered the practical limit value, the reaction passes through:

$$\frac{40 \times \overline{BO}}{\overline{GB}} = 17.2 \text{ mm}$$

when the differential displacement is:

$$\frac{1.8 \times \overline{GB}}{\overline{BO}} = 4.2 \text{ mm}$$

on the axle of the idler pulley G.

The first rigidity of the device is therefore 1.84 daN per mm, and after contact with the stop 11 it is 4.08 daN per mm for the second rigidity, leading to a ratio of 2.22 which is particularly favorable for the desired objective. During the additional rotation, the reaction on the flexible link exerted by the axle of the idler pulley passes through a value of 57.2 daN after a movement of 26 mm. These values can therefore be selected as the dynamical practical limit condition, and they can only be exceeded under exceptional conditions.

Figure 4:
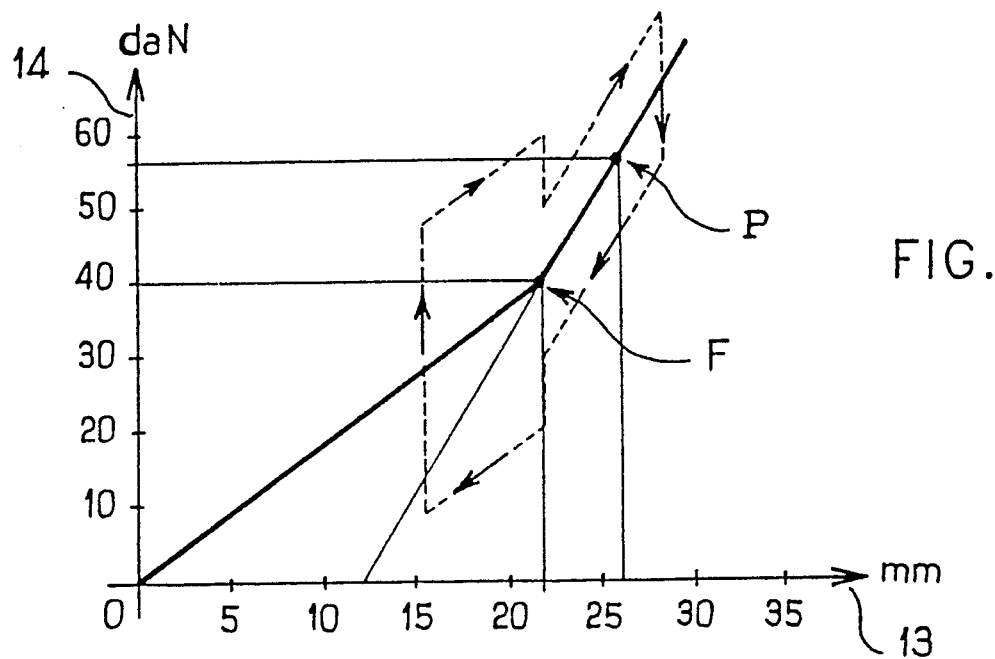
FIG. 4 is a graph of the rigidities provided on the tensioning device by the elasticity of the flat elastomeric ring.

FIG. 4 is a graph which shows in simplified form the rigidities which are a function of the geometric data, essentially the ratio between the average radius of the circular sandwich and the length of the tensioning lever.

If the stop 11 were to have a significant natural flexibility at the most-stressed point B, the flexibility would reduce the second rigidity of the device, by the addition of the two flexibilities in question. For that, it would be necessary to consider the variation of the force exerted between the "nominal" value at the beginning of the initial contact, without force, of the tensioning lever 1 against the stop 11, and the value found in the case of the practical limit condition, the sum of 40 daN exerted in the center of the sandwich O and 17.2 daN, the additional value, exerted on the axle of the idler pulley G.

It is logical that the actual force of 57.2 daN exerted on the axle of the idler pulley G is found at the most-stressed point B. Under these conditions, the circular sandwich is subjected only to a pure torsion torque, exerted on the segment GB, a torque equal to the effect of the forces exerted in opposite directions on the extremities of the segment GO.

The following statement explains the effect of the relative geometric arrangements of the components: if the idler pulley is close to the circular sandwich (short segment GB), the second rigidity becomes greater, while the first rigidity is reduced by the effect of the shear. The actual center of deformation during the first rotation, which is the center of rotation C, is then at an increased distance from the center of the sandwich O.

The limit position for this center of rotation C would be the least-stressed point D, where the deformation would be zero, because the axis of the pulley G would then coincide with the stop 11 at the most-stressed point B, cancelling any effect of the rotation and reducing the function of the device to that of the elastic means disclosed by the prior art.

The relative geometric arrangements of the components provide the means of modulating the two rigidities represented by the slopes of the straight lines in the graph in FIG. 4.

In the graph, the displacement of the cylindrical pulley 3 is plotted on the abscissa over the trajectory arc A. Strictly speaking, the trajectory arc A consists of an arc having a radius of 109 mm (radius GC) travelled by the axle of the idler pulley G over the distance of 21.8 mm, extended by an arc having a radius of 70 mm (radius CB) when there are dynamic variations of position.

The useful zone from the point F is 4.2 mm, up to the practical limit condition represented by the point P on the graph, a position which can, under exceptional conditions, be exceeded by the axle of the idler pulley G (which, moreover, runs through the arc having the radius GB). The values entered on the abscissa 13 are thus the measurements (in mm) of curvilinear arcs travelled on the trajectory defined by the total of two parts of the trajectory arc A.

The ordinates 14 plot the value of the resulting reactions, e.g. on the 40 daN level for the value corresponding to the normal tension force F and 57.2 daN for the practical limit condition represented by the point P.

The slopes of the segments OF and FP represent the rigidities of the corresponding elastic recall, having a ratio of 2.22 in the numerical application cited above.

The dynamic variations of position of the idler pulley, on either side of the preferred operating point where the normal tension force F is applied, are quite obviously damped by the rubbing of the friction washer 9. The latter, however, subjected to an elastic prestress having a constant value, pivots under the effect of the first rigidity around the center of rotation C, while its rotation takes place under the effect of the second, higher rigidity around the most-stressed point B located on the friction surface.

The friction torque is a function of the actual dimensions of the friction washer, which are generally smaller than the dimensions of the circular sandwich. The values of the friction torque are estimated to be in a ratio of two, between the lowest rigidity, in rotation around the center of rotation C, and when the device pivots around the highest-stress point B, which is part of the friction surface.

In FIG. 4, the cycle indicated by the arrows, shown in the broken lines, illustrates the effect of the friction damping during an oscillation on either side of the application point of the normal tension force F, assuming that the movement is opposed by a constant friction. The absolute value of the damping is equal to one-half the elastic recall in rotation around the center of rotation C and is equal to one-quarter of the elastic recall when the rotation takes place around the most-stressed point B.

FIG. 5 shows, in axial section, an image of the preferably rubber/metal component forming the essential part of the device according to the invention. The rigid armatures, which are intimately bonded to the elastomeric compound of the circular sandwich 5, essentially consist of the connecting shaft 4, which is preferably of a round form, and the casing 6, which is itself also preferably of a round form, and which casing 6 has clamping pads 7 and the projection 12 with stop 11.

A circumferential clearance space 15 is provided between the external surface of the circular sandwich 5 and the internal surface of the casing 6 to allow the necessary movements to take place around the center of rotation C, which is different from the axis of revolution or center O. In the above example for the diesel engine, the difference between C and O is only 9 mm before the entry of the tensioning lever into contact with the stop 11.

The rubber/metal component of the circular sandwich also has a shoulder 16 to hold the internal armature 10. The stop 11, suitable for contact with the tensioning lever 1, is supported by a projection 12 on the casing 6 and must have a high rigidity. For example, the stop 11 should preferably be made from a material such as a film of low-thickness elastomer compound having good resistance to dynamic stresses, similar to the resistance provided by the circular sandwich.

A preferential fabrication process for the device according to the invention includes the molding of the rubber/metal component according to the conventional processes used by the rubber transformation industry, followed by the assembly of the components.

Prior to the molding of the rubber/metal element, the rigid armatures, preferably made of stamped or rotary-extruded steel sheet, as well as the internal armature, preferably made of reinforced or unreinforced polyamide, are coated with appropriate adhesives on the necessary surfaces to provide an intimate physico-chemical bonding during the reticulation of the elastomer compound.

The preferable elastomer compound used during the molding is selected to preferably have a high fatigue strength and a high creep strength, under the operating conditions for which it will be subjected, i.e. under permanent precompression, having a ceiling shear stress of an essentially constant value at the most-stressed point. The shear assumes a lower and variable value at all other points of the material.

The circumferential clearance 15 is determined by the clearance necessary for the unmolding of the rubber/metal component. The shoulder 16 is used, during the molding, to hold the internal armature 10 in position. Overthicknesses 17', realized during the molding, act as joints to hold the friction washer 9 by its outside diameter. The formation of the stop 11, advantageously results from the flux of elastomer compound coming from the circular sandwich, by a communication provided in the wall of the casing 6 at the level of the projection 12.

The components are assembled under precompression of the circular sandwich, controlled by a measurement of the relative geometric crushing of its elastomer compound. For an average thickness of 16.25 millimeters in the practical example discussed above, a precompression value of about 10%, i.e. about 1.6 mm, constitutes a maximum allowable order of magnitude. The clamping pads are then folded back, to keep the height of the circular sandwich at the corresponding value when it encloses the friction washer.

The force fitting of the tensioning lever 1 onto the connecting shaft 4 provides its orientation relative to the fastening plate. The tensioning lever 1 supports the cylindrical pulley 3 and its axle 2, which were previously fitted in a hole made during the stamping of the lever.

An additional and optional operation which can preferably be performed after the above-mentioned steps, and which has proven beneficial, preferably consists of exerting an elastic tensioning torque on the tensioning lever 1 at the factory so that the tensioning lever 1 is in temporary contact against the stop 11. The tension is then maintained by the installation of a stationary holding pin into the opposite region at the least stressed point D, which point D becomes the most-stressed point during this temporary situation, to lock the tensioning lever 1 in a "stressed" position. A simultaneous piercing of the tensioning lever 1 and of the casing 6, when the nominal torque is exerted, makes it possible to install the pin and lock the device in the "stressed" position.

When a pin is inserted as described above, the adjustment on the assembly line is essentially limited to placing the cylindrical pulley in contact with the flexible link and then releasing the stress by extracting the pin, thus tensioning the flexible link the desired amount.

The idler pulley with double rigidity and an imaginary center according to the invention has the following advantages in relation to the devices of the prior art:

It provides elastic tension by stressing an elastomer compound under the best possible conditions of utilization, the tension having a maximum value at the most highly-stressed point, to ensure a long service life of the idler pulley;

The damping at the most highly-stressed point is provided by constant friction on surfaces which are not highly-stressed and which are well protected from all pollution, and the damping is therefore not sensitive to variations;

The components are essentially simple in design and make few demands in terms of geometry, and can therefore be economically manufactured in large quantities for tensioning levers of different lengths or different tensions which can be common to numerous applications; and Any temperature variations have a favorable effect of being able to correct the tension: the modulus of elasticity of the elastomer compound, which is increased by cold, increases the reaction when the center-to-center distances on the engine crank case tend to contract; and conversely, the modulus of elasticity is reduced by high temperatures, and thus compensates for any excess tension which may be due to variations of the center-to-center distance.

In summary, one feature of the invention resides broadly in a tensioning device for transmissions operating by mechanical adherence of a flexible link, the tensioning device having an idler pulley supported by a tensioning lever 1, on which an elastic torque is exerted by torsional shearing of a flat circular sandwich 5, made of elastomer compound integrated with rigid armatures and subjected to an axial prestress making it possible to damp the tension variations by the relative friction of flat surfaces also subjected to the axial prestress, and contact between which provides resistance to tipping outside the plane of the tensioning lever 1, where the tensioning device is characterized by the fact that its rotation, combined with a shearing in the same plane of the circular sandwich, first takes place around an imaginary center of rotation C, and by the fact that the entry into contact of a stop 11 in the immediate vicinity of the operating position makes it possible to have two significantly differentiated rigidities of the elastic recall of the idler pulley 3, the lower one on the relaxation side and the higher one on the tension increase side of the flexible link, by changing the apparent center of rotation of the arm forming the tensioning lever 1.

Another feature of the invention resides broadly in a tensioning device characterized by the fact that the axial prestress of the circular sandwich 5 is exerted between the fastening plate 8 and the bottom of the casing 6 by folding back the clamping pads 7, the stress being exerted via a friction washer 9, which follows the relative rotations of the two solids which enclose it, serving as armatures adherized to the circular sandwich 5, in each of its rotational movements, thereby damping by friction the dynamic variations of the tension exerted on the flexible link.

Yet another feature of the invention resides broadly in a tensioning device characterized by the fact that the axial rigidity of the circular sandwich 5 is increased by the interposition of at least one internal armature 10, this arrangement making it possible to exert, on the flat surfaces in frictional contact with one another or on the friction washer 9, axial compression stresses which are at least ten times higher than the elastic torsion stresses in the circular sandwich 5 which are perpendicular to them.

A further feature of the invention resides broadly in a tensioning device characterized by the fact that each internal armature 10 is flat.

A yet further feature of the invention resides broadly in a tensioning device characterized by the fact that the internal armature or armatures 10 are biconical.

Yet another further feature of the invention resides broadly in a tensioning device characterized by the fact that the ratio of the rigidities exerted on the axle of the idler pulley G by rotation around the imaginary center of rotation C of the relaxation side and by rotation around the contact of the stop 11, on the tension increase side, is at least equal to two.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings, in their entirety, including all dimensions, proportions and/or shapes in at least one embodiment of the invention, are accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention. That is, a technician skilled in the art, of course, can make various modifications to the mechanical or geometric characteristics without going beyond the scope of the invention.

What is claimed is:

1. An internal combustion engine comprising: mechanical power generating means for generating mechanical power;

first wheel device being connected to and receiving mechanical power from said mechanical power generating means;

second wheel device positioned in spaced apart relation to said first wheel device, said second wheel device being connected to and receiving at least a portion of said mechanical power from said first wheel device;

belt means having a surface, said belt means being connected between said first wheel device and said second wheel device for transferring mechanical power from said first wheel device to said second wheel device by mechanical friction;

belt tensioning means for being in contact with said surface of said belt means for adjusting the tension of said belt means by applying a controlled amount of force to said surface of said belt means, said belt tensioning means comprising:

mounting means for being mounted on a first surface, said mounting means for movably supporting said belt tensioning means;

movable member means having a first end and a second end, said movable member means being at least rotatably movable relative to said mounting means to alter the tension of the belt means;

said first end of said movable member means for being in rolling contact with the belt;

said second end of said movable member means for being resiliently connected to said mounting means by resilient member means;

said resilient member means for receiving a torsional force and applying a torsional counter force between said mounting means and said movable member means when said movable member means is rotated relative to said mounting means;

said movable member means being substantially rotatable about at least a first center of rotation and a second center of rotation;

said first center of rotation being substantially adjacent said second end of said movable member means;

said mounting means comprising stop mean for limiting rotation of said movable member means around said first center of rotation;

said stop means comprising said second center of rotation, said second center of rotation being positioned substantially between said first center of rotation and said first end of said movable member means;

said torsional counter force having a first elastic recall rigidity during rotation about said first center of rotation; and said torsional counter force having a second elastic recall rigidity during rotation about said second center of rotation.

2. The internal combustion engine of claim 1, wherein:

said movable member means rotates in a first plane;

said resilient member means has an at least partially solid interior;

said resilient member means defines an axis; and said resilient member means being positioned in compression between said mounting means and said movable member means to thereby apply an axial force along said axis to said mounting means and said movable member means to dampen tension variations and provide resistance to tipping of said movable member out of said first plane of rotation, said compressed resilient member means thereby applying axial stress along said axis.

3. The internal combustion engine of claim 2, wherein said resilient member means comprise:

an axis about which said movable member means rotates, and a calculated center of rotation defined by the forces acting on the resilient member, said axis of rotation and said calculated center of rotation being spaced apart from one another.

4. The internal combustion engine of claim 3, wherein said second recall rigidity is greater than said first recall rigidity.

5. The internal combustion engine of claim 4, wherein:

said mounting means further comprises a friction means disposed substantially between said second end of said movable member means and said mounting means;

said second end of said movable member means comprises a first surface and a second surface, said first surface of said second end being integrally bonded to said resilient member means, and said second surface of said second end being disposed adjacent a first surface of said friction means;

said second surface of said second end and said first surface of said friction means having a mutual coefficient of friction which provides a preselected level of frictional force between said friction means and said movable member means when said movable member means is moved relative to said mounting means and when a preselected force is applied between said friction means and said movable member means.

6. The internal combustion engine of claim 5, wherein said resilient member means further comprises intermediate armature means positioned at least partially within said interior of said resilient member means for increasing said axial force applied by said resilient member means along said axis, said intermediate armature means for increasing said axial stress applied by said resilient member means along said axis, said axial stresses being at least ten times greater than the torsional stresses.

7. The internal combustion engine of claim 6, wherein:
said resilient member means is ring-shaped;
said ring-shaped resilient member means having a central hole therethrough;
said second end of said movable member means comprises axle means integrally connected to said movable member means;
said axle means being disposed substantially through the center hole of said ring-shaped resilient member means;
said axle comprising an armature, and said armature of said axle comprises the surface of the movable member means bonded to said resilient member;
said mounting means comprises an armature;
said armature of said mounting means is for being bonded to a second surface of said resilient member means; and
said resilient member means is compressed between said armature of said axle means and said armature of said mounting means.

8. The internal combustion engine of claim 7, wherein:
said second elastic recall rigidity is at least about 2 times greater than said first elastic recall rigidity; and
said resilient member is compressed by about 10%.

9. The internal combustion engine of claim 8, wherein:
said resilient member means comprises torsion shear means for developing said torsional counter force;
said intermediate armature means is at least one of:
flat and biconical;
said friction means comprises at least one of:
vinyl polytetrafluoride and polyethylene, having a coefficient of friction of in a range of about 0.10 to about 0.11 and a separation value less than 0.16;
said resilient member means comprises elastomeric material, said intermediate armature means comprises at least one of:
a rigid polymer and a metal, and said intermediate armature is intimately bonded to said elastomeric material of said resilient member;
said stop means having low elasticity;
said mounting means comprises a caseing; and said caseing has a projection comprising said stop means.

10. The internal combustion engine of claim 2, wherein:
said second elastic recall rigidity is at least about 2 times greater than said first elastic recall rigidity;
said resilient member is compressed by about 10%; and
said resilient member means comprise:
an axis about which said movable member means rotates, and
a calculated center of rotation defined by the forces acting on the resilient member, said axis of rotation and said calculated center of rotation being spaced apart from one another.

11. A belt tensioning device for tensioning a belt of a power transmission device, said belt tensioning device for being in contact with a surface of a belt for adjusting the tension of the belt by applying a force to a first surface of the belt, said belt tensioning device comprising:
mounting means for being mounted on a first surface, said mounting means for movably supporting said belt tensioning device;
movable member means having a first end and a second end, said movable member means being at least rotatably movable relative to said mounting means to alter the tension of the belt means;
said first end of said movable member means for being in rolling contact with the belt;
said second end of said movable member means for being resiliently connected to said mounting means by resilient member means;
said resilient member means for receiving a torsional force and applying a torsional counter force between said mounting means and said movable member means when said movable member means is rotated relative to said mounting means;
said movable member means being substantially rotatable about at least a first center of rotation and a second center of rotation;
said first center of rotation being substantially adjacent said second end of said movable member means;
said mounting means comprising stop means for limiting rotation of said movable member means around said first center of rotation;
said stop means comprising said second center of rotation, said second center of rotation being positioned substantially between said first center of rotation and said first end of said movable member means;
said torsional counter force having a first elastic recall rigidity during rotation about said first center of rotation; and
said torsional counter force having a second elastic recall rigidity during rotation about said second center of rotation.

12. The belt tensioning device of claim 11, wherein:
said movable member means rotates in a first plane;
said resilient member means has an at least partially solid interior;
said resilient member means defines an axis; and
said resilient member means being positioned in compression between said mounting means and said movable member means to thereby apply an axial force along said axis to said mounting means and said movable member means to dampen tension variations and provide resistance to tipping of said movable member out of said first plane of rotation, said compressed resilient member means thereby applying axial stress along said axis.

13. The belt tensioning device of claim 12, wherein said resilient member means comprise:
an axis about which said movable member means rotates, and
a calculated center of rotation defined by the forces acting on the resilient member, said axis of rotation and said calculated center of rotation being spaced apart from one another.

14. The belt tensioning device of claim 13, wherein said second recall rigidity is greater than said first recall rigidity.

15. The belt tensioning device of claim 14, wherein:
said mounting means further comprises a friction means disposed substantially between said second end of said movable member means and said mounting means;

said second end of said movable member means comprises a first surface and a second surface, said first surface of said second end being integrally bonded to said resilient member means, and said second surface of said second end being disposed adjacent a first surface of said friction means;

said second surface of said second end and said first surface of said friction means having a mutual coefficient of friction which provides a preselected level of frictional force between said friction means and said movable member means when said movable member means is moved relative to said mounting means and when a preselected force is applied between said friction means and said movable member means.

16. The belt tensioning device of claim 15, wherein said resilient member means further comprises intermediate armature means positioned at least partially within said interior of said resilient member means for increasing said axial force applied by said resilient member means along said axis, said intermediate armature means for increasing said axial stress applied by said resilient member means along said axis, said axial stresses being at least ten times greater than the torsional stresses.

17. The belt tensioning device of claim 16, wherein:
said resilient member means is ring-shaped;
said ring-shaped resilient member means having a central hole therethrough;
said second end of said movable member means comprises axle means integrally connected to said movable member means;
said axle means being disposed substantially through the center hole of said ring-shaped resilient member means;
said axle comprising an armature, and said armature of said axle comprises the surface of the movable member means bonded to said resilient member;
said mounting means comprises an armature;
said armature of said mounting means is for being bonded to a second surface of said resilient member means; and
said resilient member means is compressed between said armature of said axle means and said armature of said mounting means.

18. The belt tensioning device of claim 17, wherein:
said second elastic recall rigidity is at least about 2 times greater than said first elastic recall rigidity; and
said resilient member is compressed by about 10%.

19. The belt tensioning device of claim 18, wherein:
said resilient member means comprises torsion shear means for developing said torsional counter force;
said intermediate armature means is at least one of: flat and biconical;
said friction means comprises at least one of:
vinyl polytetrafluoride and polyethylene, having a coefficient of friction of in a range of about 0.10 to about 0.11 and a separation value less than 0.16;
said resilient member means comprises elastomeric material, said intermediate armature means comprises at least one of:
a rigid polymer and a metal, and said intermediate armature is intimately bonded to said elastomeric material of said resilient member;
said stop means having low elasticity;
said mounting means comprises a caseing; and said casing has a projection comprising said stop means.

20. The belt tensioning device of claim 12, wherein:
said second elastic recall rigidity is at least about 2 times greater than said first elastic recall rigidity;
said resilient member is compressed by about 10%; and
said resilient member means comprise:
an axis about which said movable member means rotates, and
a calculated center of rotation defined by the forces acting on the resilient member, said axis of rotation and said calculated center of rotation being spaced apart from one another.

* * * * *

UNITED STATES PATENT AND TRADEMARK OFFICE
CERTIFICATE OF CORRECTION

PATENT NO. : 5,171,188

DATED : December 15, 1992

INVENTOR(S) : Eric LARDROT, David MAYAU and Philippe STAMM

It is certified that error appears in the above-identified patent and that said Letters Patent is hereby corrected as shown below:

In column 7, line 62, after 'equation', delete "$Re^2$" (second occurrence) and insert --$Ri^2$--.

Signed and Sealed this

Sixteenth Day of May, 1995

Attest:

BRUCE LEHMAN

*Attesting Officer*    Commissioner of Patents and Trademarks